United States Patent Office 3,421,833
Patented Jan. 14, 1969

---

3,421,833
DYED AND PRINTED METAL MODIFIED POLYPROPYLENE AND PROCESSES THEREFOR
Hermann Wunderlich, Cologne-Muelheim, Germany, assignor to Farbenfabriken Bayer Aktiengesellschaft, Leverkusen, Germany, a corporation of Germany
No Drawing. Filed Apr. 30, 1964, Ser. No. 363,990
Claims priority, application Germany, May 7, 1963, F 39,666
U.S. Cl. 8—97           12 Claims
Int. Cl. D06p 3/00; C09b 65/00

ABSTRACT OF THE DISCLOSURE

Metal modified polypropylene materials may be dyed and printed by a process which comprises applying isoindolenines under dyeing conditions with the application of heat, whereby metal-containing phthalocyanines are formed which dye and print the material.

---

This invention relates to a process for the dyeing and printing of polypropylene materials and to compounds used therefore.

In spite of numerous attempts, no method which fully satisfies requirements in practice has yet been found for dyeing or printing modified and unmodified polypropylene materials of fibrous structure. The dyestuffs hitherto proposed for dyeing unmodified polypropylene materials are not satisfactory. To improve the dyeability of fibrous polypropylene materials with dyestuffs, a method has been adopted of suitably modifying the fibres (see A. J. Hall, Skinner's Silk and Rayon Record, September 1962, pages 799–800).

For dyeing metal modified polypropylene fibres, dyestuffs have recently been proposed which are alleged to be superior in their fastness properties to the dyestuffs hitherto known for dyeing polypropylene (see Chemical Week, Nov. 24, 1962, page 65; American Dyestuff Report, 21.1, 1963, pages 31–34; Belgian patent specifications 614,566, 614,776, 617,280, 619,493). These dyestuffs also do not sufficiently fulfill the requirements in practice.

It has now been found that isoindolenines, from which phthalocyanines can be obtained under the conditions of textile dyeing and textile printing, are very suitable for dyeing and printing metal modified polypropylene materials which contain metals which may be constituents of metal-containing phthalocyanines.

For the process of the invention it is advantageous to use an isoindolenine which, in one of its tautomeric forms, may be a compound of the following general formula

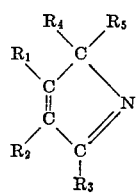

In this formula, $R_1$ and $R_2$ represent substituents, which may be linked together in ring form. There may, for example, be hydrocarbon radicals, e.g. lower alkyl radicals such as methyl or ethyl radicals. If the radicals $R_1$ and $R_2$ are linked in ring form, e.g. to form 5- or 6-membered rings, the radicals $R_1$ and $R_2$ together with the two adjacent C-atoms may form ring systems e.g. aromatic ring systems which may contain hetero atoms such as sulphur or nitrogen. These radicals in turn may be substituted, e.g. by aromatic radicals such as phenyl radicals, or alkoxy groups.

The radical $R_3$ may, for example, be an amino group, which may be substituted, or another organic radical such an alkoxy group. The radicals $R_4$ and $R_5$ may also be amino groups or alkoxy groups, which may be substituted, or the radicals $R_4$ and $R_5$ may together represent an imino group which may be substituted. The radicals $R_3$ to $R_5$ may represent further isoindolenine radicals as substituents, and there again ring structures may be formed as in polyisoindolenines which may consist, for example, of 4–6 isoindolenine units. Such polyisoindolenines may be formed, for example, by condensing 2 molecules of a 1-amino-3-iminoisoindolenine with ammonia being split off. Such isoindolenines are described, for example by Baumann, Bienert, Rösch, Vollmann and Wolff, in Angewandte Chemie, 68th Year (1956), pages 133 to 150.

Further, it is possible to use compounds which contain in the isoindolenine radical one or two alkoxy groups such as, for example, methoxy or ethoxy groups which may contain further substituents such as hydroxy groups. The isoindolenines used according to the invention need not be put into the reaction in their pure form but may be used in the form of a mixture, e.g. as obtained in the production from the corresponding dinitriles; in addition to the monomeric isoindolenines, these mixtures may also contain already condensed products which have been formed by the reaction of several isoindolenine molecules and in which e.g. the phthalocyanine ring may already be preformed by condensation of 4 or more isoindolenine units.

The following are examples of isoindolenines used according to the invention: (The formulae are given in one of the possible tautomeric forms)

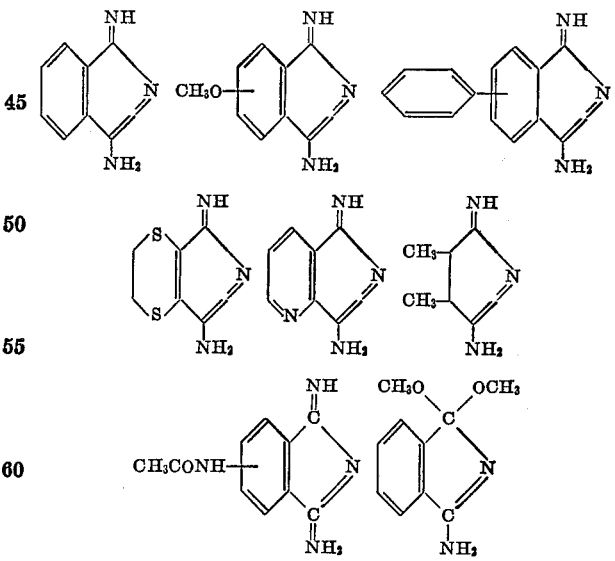

Particularly suitable for use as polypropylene materials are polypropylene fibres and webs of polypropylene fibres which have been modified with compounds of nickel, copper or cobalt. The metal modified polypropylene materials contain the metals or metal compounds directly in the polypropylene materials. This may be achieved, for example, by introducing inorganic or organic metal compounds, especially of organic metal complexes, before spinning or other working up processes of the polypropylene substance. Alternatively, the metal modified polypropylene materials may also be obtained by an after-treatment of polypropylene materials with metal-containing compounds, in which case the after-treatment should result in as far as possible a firm connection of the metal compounds with the polypropylene materials, which may be achieved, for example, by padding followed by heating. These metal modified polypropylene fibres may in addition contain the usual additives such as stabilisers and/or UV light absorbers.

The process relates in particular to polypropylene fibres containing UV absorbers and stabilizors and having incorporated, by spinning, nickel phenates of bis-(alkylphenol)-monosulfides. The dyeing and printing of the polypropylene materials is carried out by the methods usually adopted for such intermediate products of phthalocyanine synthesis, e.g. by applying the compounds used according to the invention to the polypropylene materials, e.g. the fibres or webs, from neutral or alkaline aqueous suspensions or solutions, using dispersing agents, emulsifying agents, solvents and urea, from a dye bath or a padding liquor, preferably at temperatures of 50 to 100° C. In the case of padded dyeing, it is advisable to carry out an intermediate drying process at 70 to 90° C. The padded or dyed materials are heated for 5 to 30 minutes, e.g. to 100 to 140° C. The synthesis to metal-containing phthalocyanine takes place in the process.

Suitable for use as dispersing or emulsifying agents, that are advantageously added to the dyestuffs, are the usual commercial products such as degradation products of sulphite cellulose, condensation products of higher alcohols and ethylene oxide, soaps, polyglycol ethers of fatty acid amides, formaldehyde condensation products of aromatic sulphonic acids or mixtures of these compounds.

After they have been dyed or printed, the polypropylene materials are subjected to the usual after-treatments, e.g. by treating them in a hot aqueous soap solution and/or a solution of a synthetic cleansing agent.

The intermediate products of phthalocyanine synthesis which are used according to the invention are very rapidly absorbed on the polypropylene materials and are distinguished by their very good fastness properties. Very remarkable in addition to their very high resistance to dry cleansing are their excellent resistance to washing, abrasion and light.

Example 1

20 g. of 1-amino-3-imino-isoindolenine which is represented in one of its tautomeric formulae by the formula:

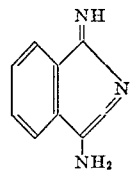

are partly dissolved at room temperature with 20 ml. of methanol, 30 ml. trichloroethylene and 20 g. of a non-ionogenic aryl polyglycol ether. After adding 70 g. urea, water is added to make the volume up to 1000 ml.

A copper modified polypropylene fibre is then padded with this liquor at room temperature and subjected to intermediate drying at 60 to 70° C. The dyestuff is developed on the polypropylene fibre material by a dry heat treatment at 130° C. within 20 minutes. After the following alkaline after-treatment at 98° C. with addition of 5 g./l. Marseilles soap and 2 g./l. calcined soda, a clear blue dyeing with very good fastness to solvents, abrasion, wetness and light is obtained.

Example 2

20 g. of the product of constitution

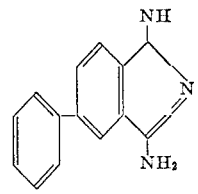

are partly dissolved with 1000 ml. methanol, 30 ml. trichloro ethylene and 60 g. of a non-ionogenic aryl polyglycol ether at room temperature for padding nickel modified fibrous polypropylene materials.

60 g. urea are added before the solution is made up to 1000 g. with water.

The polypropylene fibre is then padded at room temperature with this liquor and subjected to intermediate drying at 60 to 70° C.

The dyestuff is developed on the fibrous polypropylene material within 30 minutes by a dry heat treatment at 120° C. After an alkaline after-treatment as described in Example 1, a green dyeing with very good fastness properties is obtained.

Example 3

20 g. of the product of the constitution

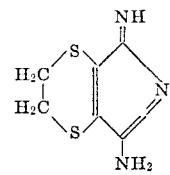

are partly dissolved with 100 ml. acetone, 30 ml. of trichloroethylene and 50 g. of a non-ionogenic aryl polyglycol ether at room temperature. 70 g. urea are then added and the volume made up to 1000 g. with water.

Nickel modified polypropylene fibres padded with this liquor at room temperature are subjected to intermediate drying at 60 to 70° C. The dyestuff is then developed on the polypropylene fibre by a dry heat treatment for 5 minutes at 140° C. To obtain a violet green dyeing with very good fastness properties, the dyed material is after-treated as described in Example 1.

Example 4

60 g. of a 1-amino-3-imino-isoindolenine of the formula

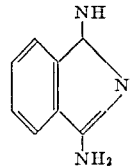

are thoroughly mixed to a paste with 120 g. of a mixture of trichloroethylene and alkyl polyglycol ether. This paste is then stirred with 260 g. water and 10 g. 23 to 25% ammonia are then added. The dispersion thus obtained is stirred into 550 g. starch tragacanth paste. The nickel modified polypropylene fibre is printed with this printing paste at room temperature and dried at 80° C.

The print is fixed and developed by condensation at a temperature of 135° C. for 8 minutes. A clear blue print with very good fastness properties is obtained by an alkaline after-treatment as described in Example 1. Similar results are obtained with the use of a cobalt modified polypropylene fibre.

The nickel modified polypropylene fibres used in Examples 2, 3 and 4 contain UV absorbers and stabilizers and having incorporated, by spinning, nickel phenates of bis-(alkylphenol)-monosulfides.

Example 5

1 g. of a compound of the following formula

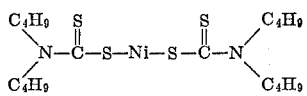

is dissolved in 10 g. of dimethylformamide. After the addition of 3 g. of a non-ionogenic aryl polyglycol ether, the volume is made up to 1000 g. with water.

The non-metallised polypropylene fibre is padded with this liquor at room temperature, subjected to intermediate drying and condensed at 135° C. for 10 minutes. The polypropylene fibre thus pretreated is further treated as described in Examples 1, 2 and 3. There are obtained a clear blue dyeing as in Example 1, a green dyeing in Example 2 and a violet grey dyeing in Example 3, all with good fastness properties.

I claim:

1. A process for dyeing and printing metal modified polypropylene materials which comprises applying isoindolenines under dyeing conditions, with the application of heat, whereby metal-containing phthalocyanines are formed which dye and print the materials.

2. A process according to claim 1, wherein the isoindolenine is a compound of the formula:

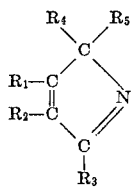

wherein $R_1$ and $R_2$ are lower alkyl, lower alkyl linked together with their adjacent carbon atoms to form a 5 or 6 member ring, lower alkyl linked together with their adjacent carbon atoms to form a 5 or 6 member ring which contains N or S heteroatoms or lower alkyl linked together with their adjacent carbon atoms to form a 5 or 6 member ring which ring contains a phenyl or alkoxy moiety, $R_3$ is amino, substituted amino or alkoxy, $R_4$ and $R_5$ are amino, alkoxy or substituted amino or alkoxy, or $R_3$, $R_4$ and $R_5$ are isoindolenine moieties thereby forming polyisoindolenines.

3. A process according to claim 2, wherein the isoindolenines are selected from the group consisting of

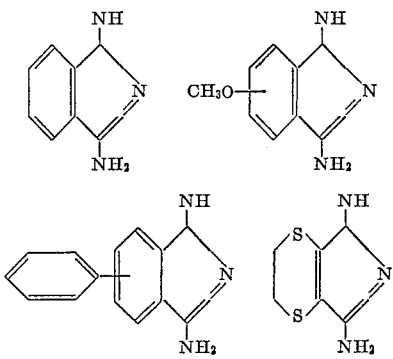

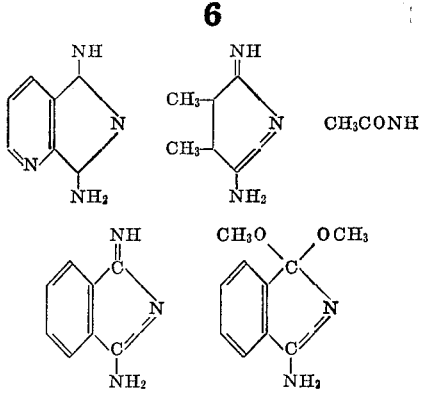

4. A process according to claim 2 which further comprises the addition of a reducing agent.

5. A process according to claim 2, wherein the isoindolenines are 1-amino-3-imino-isoindolenines.

6. A process according to claim 4, wherein the isoindolenines are 1-amino-3-imino-isoindolenines.

7. A process according to claim 2, wherein the metal is nickel, copper or cobalt.

8. A process according to claim 2, wherein the metal is nickel, copper or cobalt.

9. Polypropylene materials dyed by the process according to claim 2.

10. Polypropylene materials dyed by the process according to claim 4.

11. Polypropylene materials printed by the process according to claim 2.

12. Polypropylene materials printed by the process according to claim 4.

References Cited

UNITED STATES PATENTS 2,683,643  7/1954  Baumann et al. _____ 8—1

OTHER REFERENCES

"Colorants for Plastics," Simpson et al., Modern Plastic Encyclopedia, 1962 Issue, September 1961, vol. 39.

NORMAN G. TORCHIN, Primary Examiner.

J. P. BRAMMER, Assistant Examiner.

U.S. Cl. X.R.

8—1, 3, 55